April 26, 1955  E. C. RHYNE, JR., ET AL  2,707,260
ELECTRICAL CONTROL SYSTEMS FOR AN INDUCTION MOTOR
Filed Oct. 6, 1951

INVENTORS
Earl C. Rhyne, Jr.
Find Sandgren.

BY
Paul E. Friedemann
ATTORNEY

United States Patent Office 2,707,260
Patented Apr. 26, 1955

2,707,260

ELECTRICAL CONTROL SYSTEMS FOR AN INDUCTION MOTOR

Earl C. Rhyne, Jr., Cheektowaga, N. Y., and Find Sandgren, Chicago, Ill., assignors, by direct and mesne assignments, to Cline Electric Manufacturing Company, Chicago, Ill., a corporation of Illinois Application October 6, 1951, Serial No. 250,113

9 Claims. (Cl. 318—229)

This invention relates generally to control apparatus and systems for introduction motors and more in particular to such systems wherein control of the speed of an induction motor over a predetermined range of sub-synchronous speeds is obtained.

One object of this invention is to provide a control system for an induction motor which is simple in its elements with respect to operational requirements and which is positive in operation.

Another object of this invention is to provide a control system for an induction motor affording a control of speed over a predetermined range or a wide range of sub-synchronous speeds.

More specifically stated, it is an object of this invention to provide a control of the character referred to wherein regulation by impedance means in series with the induction motor is utilized to provide a control of the speed of the motor.

The foregoing statements are merely illustrative of the various aims and objects of this invention. Other objects and advantages will become apparent upon a study of the following specification when considered in conjunction with the accompanying drawing, in which.

Figure 1:
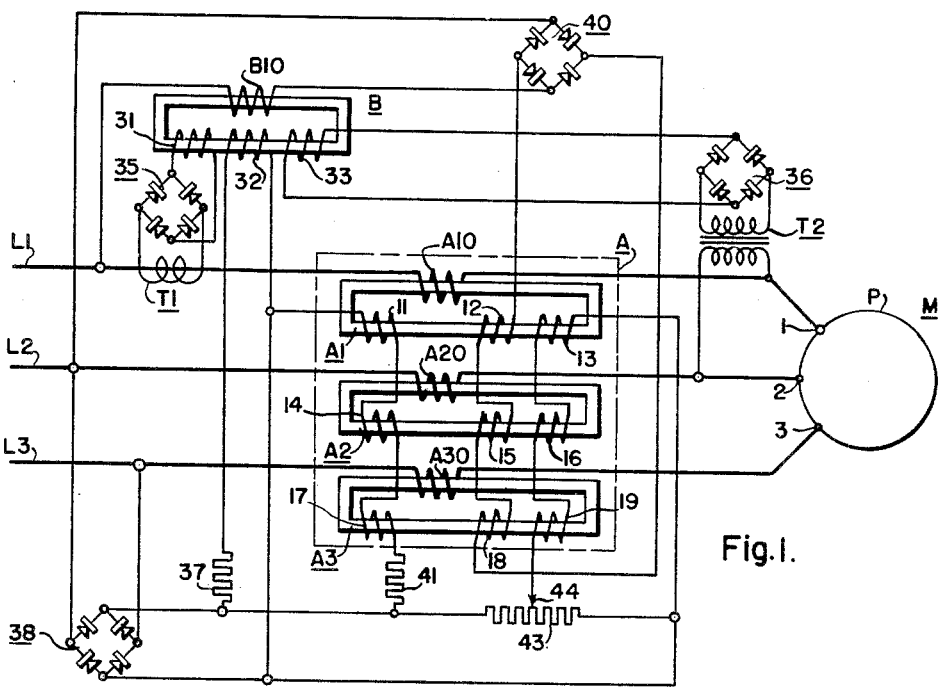
Figure 1 is a diagrammatic illustration of an embodiment of this invention.

In the diagrammatic illustration of Fig. 1, the induction motor is generally designated M, the primary winding or field winding of this machine is represented by P. In this representation, the details of the motor are not illustrated since for the purposes of this control it is immaterial whether or not the primary or field winding is Y-connected or delta-connected. Similarly, it is immaterial whether or not a wound rotor or a squirrel-cage type of rotor is employed. Hence, the rotor of this machine is not illustrated in the interest of simplicity.

The primary terminals 1, 2 and 3 of the induction motor are connected to supply lines L1, L2 and L3 which are adapted for excitation from a three-phase supply of alternating current. The supply circuit has connected therein an impedance means generally designated A, which comprises three saturable core reactors, generally designated A1, A2 and A3, respectively. Each saturable core reactor is provided with a main winding respectively designated A10, A20 and A30 which are respectively connected in series with the induction motor in the supply lines L1, L2 and L3. Each of the saturable core reactors is further provided with three control windings, saturable reactor A1 having control windings 11, 12 and 13, saturable reactor A2 having control windings 14, 15 and 16, and saturable reactor A3 having control windings 17, 18 and 19. Corresponding control windings of the separate reactors are connected in series circuit relation to be energized in dependence of certain system conditions and/or to be controlled in accordance with a predetermined pattern voltage. This will be described more in detail hereinatfer.

Figure 2:
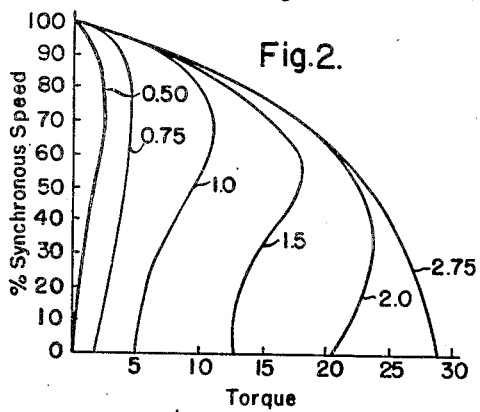
Figs. 2, 3 and 4 show curves of value in disclosing this invention.

When an attempt is made to control the speed of an induction motor by series impedances in the primary motor circuit with a fixed impedance adjustment, the obtainable stable speed control range is rather limited. This will be understood from the family of speed-torque curves shown in the diagram of Fig. 2. This diagram corresponds to test results taken with a system similar to the one shown in Fig. 1, but using only windings such as the pattern windings 13, 16 and 19 with adjusting means for these windings. The impedance of the reactor main windings was controlled only by a selected fixed adjustment of the constant direct-current bias applied by the windings 13, 16 and 19. The curves shown in Fig. 8 are denoted by values of 0.50, 0.75, 1.0, etc., which represent the fixed amounts of direct-current bias applied to the windings 13, 16 and 19. It will be observed that except for a limited range of high bias currents, and hence lowest reactance values of the alternating current main windings, the speed-torque curves have a negative slope and hence are unsuitable for speed control.

The occurrence of negative slope may be explained according to one theory as follows. For a given value of impedance adjustment, i. e., for a given value of direct current bias on the series reactor, an increase in motor torque calls for a corresponding increase in current at a given voltage and speed. The increased current thus flowing through the reactors increases the voltage drop across them, thus decreasing the motor terminal voltage. If the torque is to be maintained at this decreased terminal voltage, the current must be higher for the reduced voltage. This additional increase in current further increases the reactor voltage and decreases the motor terminal voltage. This chain of causes and results continues until the motor pulls out or reaches a low-speed stability. In summary, the drop in terminal voltage due to increasing torque and current can be taken as the cause of the instability occurring in induction motor control systems with adjustable series impedances. This is in harmony with the fact that if in a reactor control system as just mentioned, the series reactance is controlled for maintenance of constant motor terminal voltage, a family of curves is obtained substantially as illustrated in Fig. 3.

Figure 3:
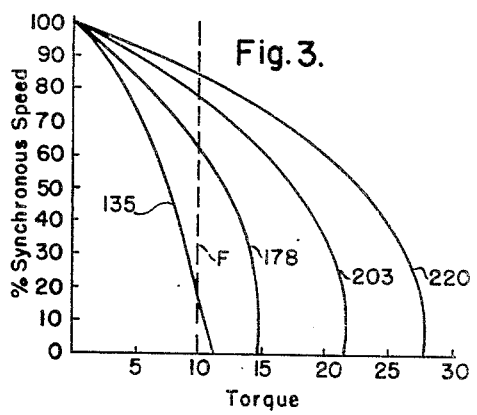
Figure 4:
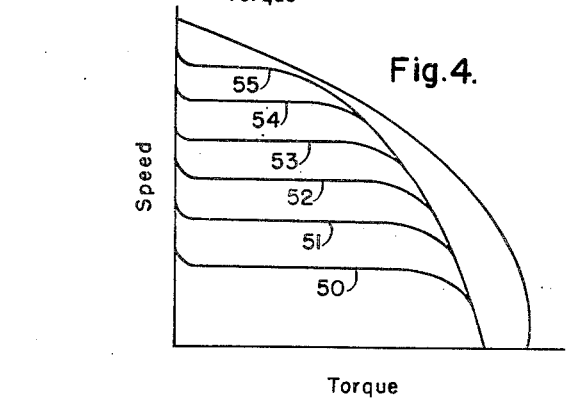

In Fig. 3 the speed-torque curves shown in full lines are denoted by selected values of constant terminal voltage (135, 178, 203, 220). It will be seen that these characteristics have positive slopes and are suitable for speed control. For instance, if the motor thus controlled is to operate at a constant load torque denoted by line F, the speed of the motor is definitely determined by the intersection of the load torque line F with the one selected speed-torque characteristic. Consequently, in a system which regulates the series impedance for constant motor terminal voltage, the just-mentioned conditions permit the selection of definite speed values simply by adjusting the control rheostat 43 in accordance with one of the available speed-torque characteristics.

From the foregoing it will be apparent that an improved control of an induction motor is possible by means affording suitable regulation of the terminal voltage of the primary winding of the motor. By such means the speed may be regulated over a relatively wide range of sub-synchronous speeds while yet providing a satisfactory torque output of the motor. In accomplishing this, the control windings of the three saturable reactor windings are controlled or excited in dependence of system conditions including the primary terminal voltage of the motor and the load current or supply current of the motor. To this end, an auxiliary reactor, generally designated B, which is also of the saturable core type, is provided. This auxiliary reactor includes a main winding B10 and three control windings 31, 32 and 33. Control winding 31 is energized in dependence of the load current or supply current of the motor M by means of a current transformer generally designated T1 having the primary winding thereof connected in series in the supply line L1 and the secondary winding thereof connected across the input terminals of a full-wave rectifier 35, the output terminals of which are connected across the control winding 31.

Control winding 33 is energized in dependence of the terminal voltage of the primary winding of the motor M by means of a transformer T2 which is connected across the phase L1, L2 of the primary winding of the motor. The secondary winding of transformer T2 is connected to the input terminals of a full-wave rectifier 36, the output terminals of which are connected across the control winding 33. Control winding 32 of transfer reactor B is a bias winding which is supplied with direct current through a calibrating resistor 37 from the output of a full-wave rectifier 38 having its input connected across phase L2, L3 of the supply. This bias winding 32 affords a predetermined degree of base saturation of the core of the transfer reactor B and is poled so that its flux is cumulative with respect to the flux of control winding 31. Control winding 33 is poled so that its flux opposes that of winding 31 and, of course, also that of 32. Control winding 32 may be dispensed with by suitably electrically dimensioning the windings 31 and 33 and the excitation therefor, respectively, so as to provide the required degree of base excitation. In certain other applications, this base excitation may not be required and the winding 32 may be dispensed with in such instances also.

Main winding B10 of transformer reactor B is connected across phase L1, L2 of the supply in a series circuit including the input terminals of a full-wave rectifier 40, the output terminals of which are connected across the series connected group of windings 12, 15 and 18 of the saturable core reactor assembly A. Windings 11, 14 and 17 which are series connected are connected in series with a calibrating resistor 41 across the output terminals of full wave rectifier 38 and function, as winding 32 of saturable reactor B, as fixed bias windings to provide the required degree of saturation of the cores of the respective reactors A1, A2 and A3, if needed. Considerations pertaining to the use of these windings are analogous to the considerations advanced in connection with the control winding 32. Control windings 13, 16 and 19 on the respective reactors of the assembly A are connected in series across a tapped portion of a potentiometer 43, the tap of which is designated 44. The potentiometer 43 is also connected across the output of full-wave rectifier 38. Rectifier 38 furnishes a source of substantially constant direct current which is used for the bias windings of the transfer reactor B and the reactor assembly A as well as a source of energization for the potentiometer 43. This source may be any suitable type of direct current source which provides a substantially constant direct current output.

The operation of the system illustrated in Fig. 1 is essentially as follows. When the motor is energized by means of the usual main line contactors, auxiliary control relays and push-button equipment, not illustrated in the interest of simplicity, current is supplied to the primary winding P of the motor M over the supply conductors L1, L2, L3 through the main windings A10, A20 and A30 of the saturable reactors. As a rule, a motor such as M is started at relatively low speed. Under such conditions, the tap of potentiometer 44 is moved to a position in which the tapped voltage is a minimum. Such a position would be on the extreme right as viewed in Fig. 1. As the motor accelerates to the base speed, indicated by the setting of the tap, the system is regulated for this base speed by means of the control afforded by the intelligence derived from the line current and the primary winding terminal voltage. Such a base or minimum speed may be represented for example by the speed-torque characteristic 50 illustrated in Fig. 3, in which the group of speed-torque curves, representing substantially the characteristic performance of the present system, are numbered 50 through 55. For a given speed of the motor M at a given load torque, the terminal voltage of the motor will assume a certain value and likewise the load current will become a certain value. At this point, the resulting saturation of the core of the transfer reactor B is such as to provide the required excitation for the control windings 12, 15 and 18 of reactor assembly A so that the speed of the motor will be maintained substantially constant. Should the load torque for any reason vary for this particular speed setting, as determined by the speed setting of the tap 44 of potentiometer 43, the resulting drop in primary winding terminal voltage due, in part, to decreasing impedance of the motor primary coupled with increasing load current which increases the drop across the series connected main windings of reactor assembly A, results in a shift in the degree of saturation of the transfer reactor B upwardly. This causes a drop in the reactance of winding B10 which permits an increase in current flow therethrough to the extent required to provide a degree of saturation control of windings 12, 15 and 18 and consequently the respective cores associated therewith, so that the current supplied to the motor may be increased and simultaneously the primary winding terminal voltage increased in a direction approaching its original value. It will, therefore, be appreciated that the voltage cue and the current cue which are opposed in the transfer reactor B provide regulation of the reactance of the reactor assembly A in a direction to restore or to maintain the desired operating characteristics of the motor M.

As the curves in Fig. 3 illustrate, for different degrees of saturation of the cores of saturable reactors A1, A2 and A3, as determined by the setting of tap 44 on resistor 43, the speed of the motor may be increased to substantially 100% of synchronous speed. These curves show a stepped variation of motor speed. However, by the provision of a variable voltage connection with windings 13, 16 and 19 involving voltage changes in sufficiently small increments, the speed change may be made essentially stepless.

Although but one embodiment of this invention has been illustrated, it will be appreciated that numerous variations of this specific circuit may be made by those skilled in the art within the spirit of this invention. While the use of an auxiliary reactor, such as B, for combining the control stimuli externally of the main reactor A offers certain advantages, it is feasible to combine these voltages in a control winding group such as 12, 15 and 18 or in separate similar control winding groups on the main reactor assembly to achieve essentially the same results.

Other corresponding variations in control details may also be practiced within the scope of this invention. Accordingly, the foregoing disclosure and the showings made in the drawing are intended to be interpreted only as illustrative and not in a limiting sense.

We claim as our invention:

1. In a control for an alternating-current induction motor supplied by a plural phase alternating current supply circuit, the combination of, saturable reactor means connected in series between the supply of current and said motor and including a control device in each of a plurality of phases of said supply circuit to control the alternating-current energization thereof, control winding means associated with said saturable reactor for controlling the reactance thereof, current responsive means connected with the primary winding of said motor to respond to the alternating-energizing current supplied to the motor, voltage responsive means connected to the primary winding of said motor to be energized in dependence of the alternating-current terminal voltage of said motor, an auxiliary saturable reactor having a main winding and a pair of differentially related saturation control windings, circuit means connecting one of said pair of saturation control windings to said current responsive means, circuit means connecting the other of said pair of saturation control windings to said voltage responsive means, and circuit means connecting said main winding of said auxiliary saturable reactor to said control winding means for energizing said control winding means.

2. In a control for an induction motor, the combination of, saturable reactor means connected in series with said motor to control the energization thereof, control winding means associated with said saturable reactor for controlling the reactance thereof, current responsive means connected with said motor to respond to the energizing current supplied to the motor, voltage responsive means connected to the motor to be energized in dependence of the terminal voltage of said motor, a second saturable reactor having a main winding adapted for excitation with alternating current and having a pair of differentially related saturation control windings, circuit means connecting one of said pair of saturation control windings to said current responsive means, circuit means connecting the other of said pair of saturation control windings to said voltage responsive means, and rectifier means connecting said main winding to said control winding means to effect energization thereof.

3. In a control for an induction motor, the combination of, saturable reactor means connected in series with said motor to control the energization thereof, control winding means associated with said saturable reactor for controlling the reactance thereof, current responsive means connected with said motor to respond to the energizing current supplied to the motor, voltage responsive means connected to the motor to be energized in dependence of the terminal voltage of said motor, a second saturable reactor having a main winding adapted for excitation with alternating current and having a pair of differentially related saturation control windings, circuit means connecting one of said pair of saturation control windings to said current responsive means, circuit means connecting the other of said pair of saturation control windings to said voltage responsive means, rectifier means connecting said main winding to said control winding means to effect energization thereof, and control winding means on said saturable reactor means for applying an adjustable constant degree of saturating bias to said saturable reactor means.

4. In a control for an induction motor having a primary winding, the combination of, a first saturable reactor having a main winding and a control winding, said main winding being connected in series with said primary winding, a second saturable reactor having a main winding adapted for energization with alternating current and a pair of control windings, a current transformer connected in series with said motor, rectifier means connecting the output of said current transformer to one of said pair of control windings, a voltage transformer connected to said motor to be energized in dependence of the voltage of said primary winding, rectifier means connecting the output of said voltage transformer to the other of said pair of control windings, said pair of control windings being differentially related, and rectifier means connecting the main winding of said second saturable reactor to the control winding of said first saturable reactor.

5. Apparatus as set forth in claim 4 comprising an additional control winding for said first saturable reactor, and circuit connections for applying an adjustable constant excitation to said additional control winding.

6. In a control for an induction motor having a three-phase primary winding, the combination of, three saturable reactors each having a main winding connected in series in one phase of the primary winding and each having a control winding, said control windings being connected in series circuit relation, a separate saturable reactor having a main winding adapted for excitation with alternating current and having a pair of differentially related control windings, a current transformer connected in series with the main winding of one of said three saturable reactors, rectifier means connecting the output of said current transformer to one of said pair of control windings, a voltage transformer connected across one phase of said primary winding to be energized thereby, rectifier means connecting the output of said voltage transformer to the other of said pair of control windings, and rectifier means connecting the series connected control windings of said three saturable reactors to the main winding of said separate saturable reactor.

7. Apparatus as set forth in claim 6 comprising an additional control winding for each of said three saturable reactors, said additional control windings being connected in series circuit relation, and adjustable impedance means connected with said additional series connected control windings for controlling the excitation thereof.

8. A motor control system, comprising an induction motor having an alternating-current supply circuit, saturable reactance means having an alternating-current main winding series connected in said supply circuit and having direct-current control winding means for controlling the reactance of said main winding, a direct-current source of adjustable constant voltage connected with said control winding means for controlling said reactance, voltage-responsive circuit means having a variable direct-current output voltage and being output-wise connected with said control winding means for controlling said reactance, said circuit means being input-wise connected with said supply circuit and responsive to a voltage condition of said supply circuit dependent upon said reactance, and current-responsive means connected with said supply circuit and said reactance means for superimposing on said reactance means another control dependent upon the current in said supply circuit, said circuit means and said current-responsive means being poled in the sense required for stable motor performance.

9. A motor control system, comprising an induction motor, an alternating-current supply circuit connected with said motor, main saturable reactance means series connected in said supply circuit and having direct-current control windings, an auxiliary saturable reactor having an input circuit connected to said supply circuit and having an output circuit connected to said control windings, control windings on said auxiliary saturable reactor, a source of normally constant bias voltage, and rectifying circuit means connected with said supply circuit to provide a voltage varying in a given relation to the terminal voltage of said motor, said circuit means and said source being connected with said control windings of said auxiliary saturable reactor for jointly controlling the reactance of said auxiliary saturable reactor by said voltages, said voltages being poled relative to each other in the sense needed for stable speed-torque performance of said motor.

References Cited in the file of this patent

UNITED STATES PATENTS

| Re. 21,407 | Croden | Mar. 26, 1940 |
| 2,247,073 | Thompson | June 24, 1941 |
| 2,376,522 | Storm | May 22, 1945 |
| 2,433,153 | Pell et al. | Dec. 23, 1947 |
| 2,455,869 | Krabbe | Dec. 7, 1948 |
| 2,589,277 | Noodleman | Mar. 18, 1952 |

FOREIGN PATENTS

| 832,771 | France | July 4, 1938 |